Feb. 22, 1938. W. P. DALRYMPLE 2,108,798
FILTER
Filed Nov. 3, 1933 3 Sheets-Sheet 1

Inventor,—
William P. Dalrymple,
By Fricke + DeBusk,
Attorneys.

Feb. 22, 1938.  W. P. DALRYMPLE  2,108,798
FILTER
Filed Nov. 3, 1933  3 Sheets-Sheet 2

Inventor,—
William P. Dalrymple
By Fricke + DeBusk
Attorneys.

Feb. 22, 1938.  W. P. DALRYMPLE  2,108,798
FILTER
Filed Nov. 3, 1933   3 Sheets-Sheet 3
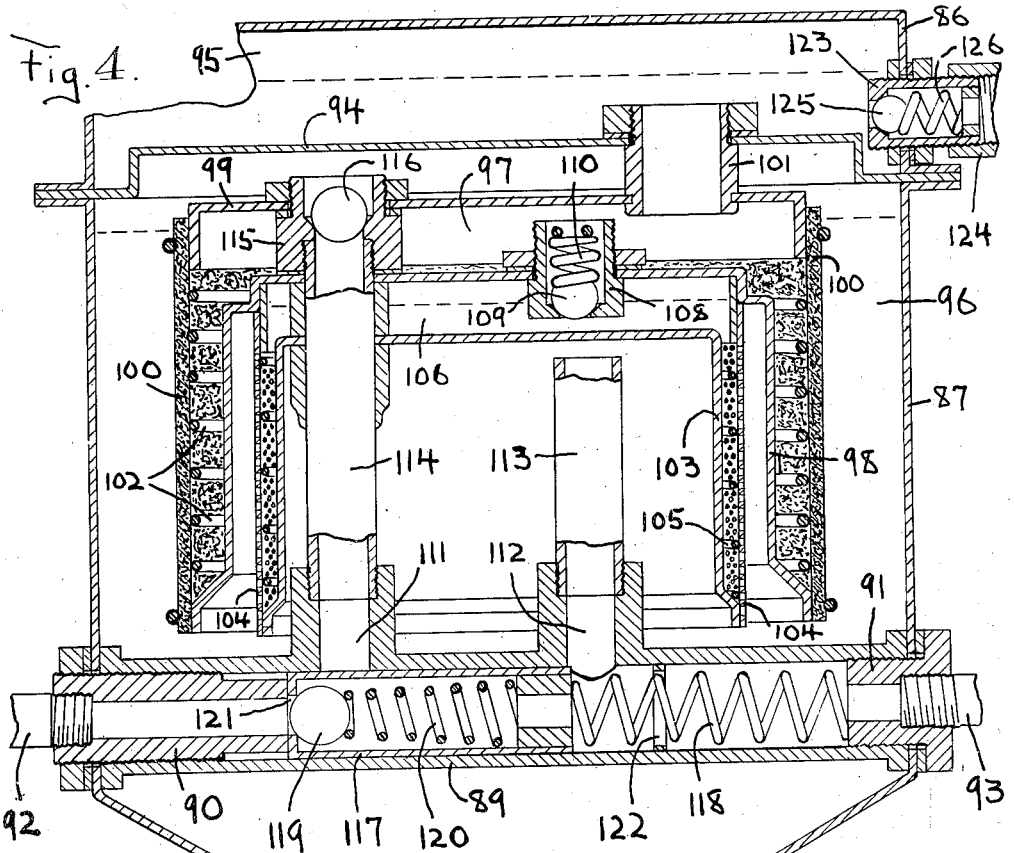
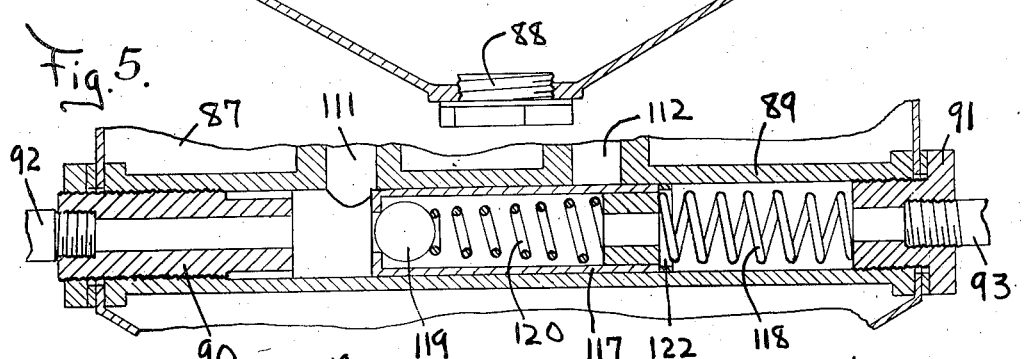
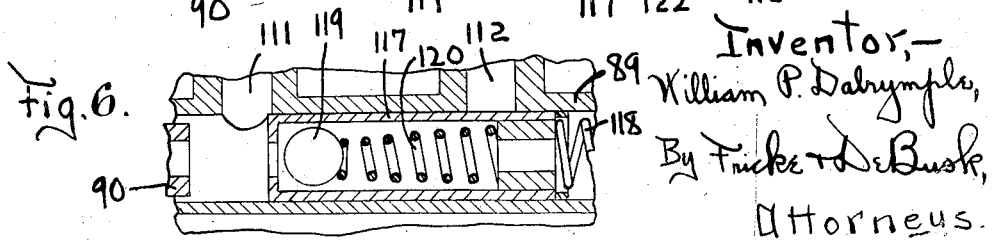

Patented Feb. 22, 1938

2,108,798

UNITED STATES PATENT OFFICE 2,108,798

FILTER

William P. Dalrymple, Chicago, Ill.

Application November 3, 1933, Serial No. 696,475

15 Claims. (Cl. 210—167)

My invention relates to filters of a type comprising a filtering medium through which the fluid to be cleaned is passed under pressure, and the device as shown is designed particularly for use for filtering the oil functioning in the crank case and associated bearings of an automobile. It is the object of my invention to provide a new and improved form and arrangement of parts by the operation of which the filtering medium is subjected to a cleaning operation from time to time in the use of the filter or from time to time in the ordinary use of the automobile on which the filter is mounted, preferably by automatic action controlled by the use of the filter or the car.

It is one of the objects of my invention to provide an improved arrangement of this type in which a reversal of the direction of flow of the liquid being filtered through the filtering medium is produced at intervals whereby the dirt and grit which have gathered on the filtering medium shall be flushed loose and washed down so as to settle out of the path of movement of the liquid to the filtering medium, the arrangement being such that there shall be no danger that such dirt shall later find its way again either into the path of the liquid to the filtering medium or into the path of the liquid to the outlet means through which clean oil normally is delivered.

It is the further object of my invention to provide an improved arrangement of this type by which a cleaning operation shall be effected automatically each time when the flow of liquid to the inlet chamber of the filter is stopped, either by reason of a stoppage of the motor or otherwise, such cleaning operation being controlled preferably by the changes in the pressure upon the liquid in the feed line to the filter.

To this end, it is one of the objects of my invention to provide improved means controlled by the pressure of the liquid in the feed line for regulating the direction of flow of the liquid through the filtering medium either by a change in the connections through which the liquid passes to or from the filter or otherwise. It is one of the objects of my invention to provide an improved arrangement of this type in which a reversal of the direction of flow of the liquid through the filtering medium is brought about by a pressure condition built up in the filter during the delivery of liquid thereto, such built-up pressure within the filter being adapted when the flow of liquid to the filter is stopped to cause the desired reversal of the direction of flow of the liquid through the filtering medium, such built-up pressure having been produced by the compression of a quantity of air or other compressible means within the filter.

It is one of the objects of my invention to provide in a device of this type an improved arrangement of housing means and communicating valves whereby a quantity of air trapped within the filter is compressed during the use of the filter so as to be ready after the use of the filter has terminated to expand and effect the desired cleaning of the filtering medium. It is one of the objects of my invention to give the several parts such an improved arrangement and location with respect to each other as to cause a minimum of disturbance of the collected dirt and grit during the functioning of the filter for delivering cleaned liquid, the cleaning of the filtering medium being preferably effected at a time when the normal functioning of the filter has stopped.

It is another object of my invention to provide an auxiliary filtering member which shall definitely prevent the escape of the collected dirt and grit from the receptacle during the operation of cleaning the principal filtering medium.

It is one of the objects of my invention to provide an improved arrangement comprising a pressure valve in the outlet means through which the cleaned liquid normally escapes from the filter for insuring that the desired degree of pressure shall be built up in the filter during the delivery of liquid to the filter for being cleaned, whereby the desired expansion effect may be obtained when the delivery of liquid to the filter ceases.

It is another object of my invention to provide an improved arrangement comprising two or more separate filtering mediums of different types or different characteristics otherwise whereby they shall offer different degrees of resistance to the passage of the liquid to be filtered, and to provide in such arrangement a suitable form of pressure valve in connection with one or the other of said filtering mediums for providing the desired differential action. It is another object of my invention to provide a by-pass arrangement whereby liquid delivered to the filter can be passed through the filter without going through the filtering medium in case unexpected resistance to the passage of the liquid through the filtering medium should be encountered.

It is another object of my invention to improve devices of this type in sundry details hereinafter pointed out. The preferred means by which I have accomplished my several objects are illustrated in the accompanying drawings and are hereinafter specifically described. That which I believe to be new and desire to cover by this application is set forth in the claims.

In the drawings,—

Fig. 4 is a central vertical section through another modified form of construction; and Figs. 5 and 6 are views similar to portions of Fig. 4 but showing a changed position of certain of the parts.

Figure 1:
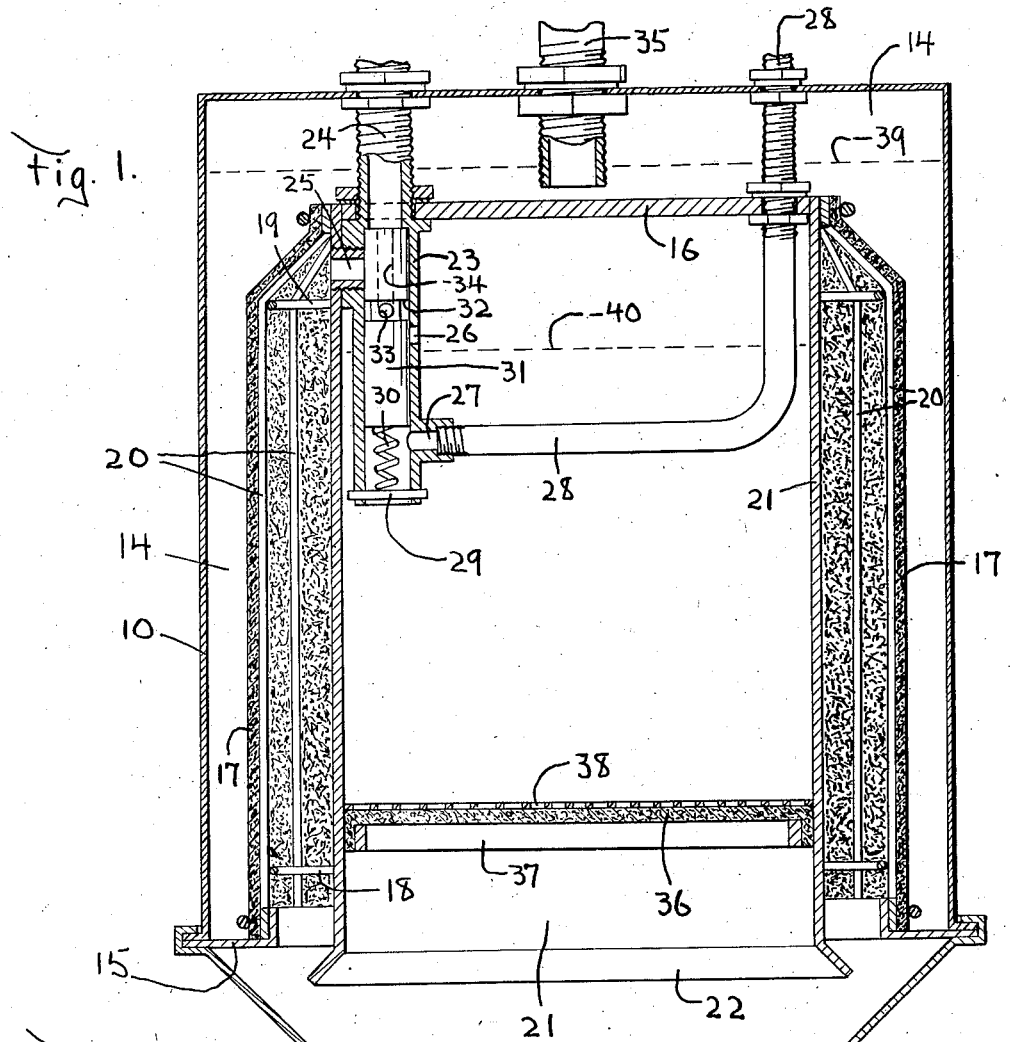
Fig. 1 is a central vertical section through one form of my improved filter.
Figure 2:
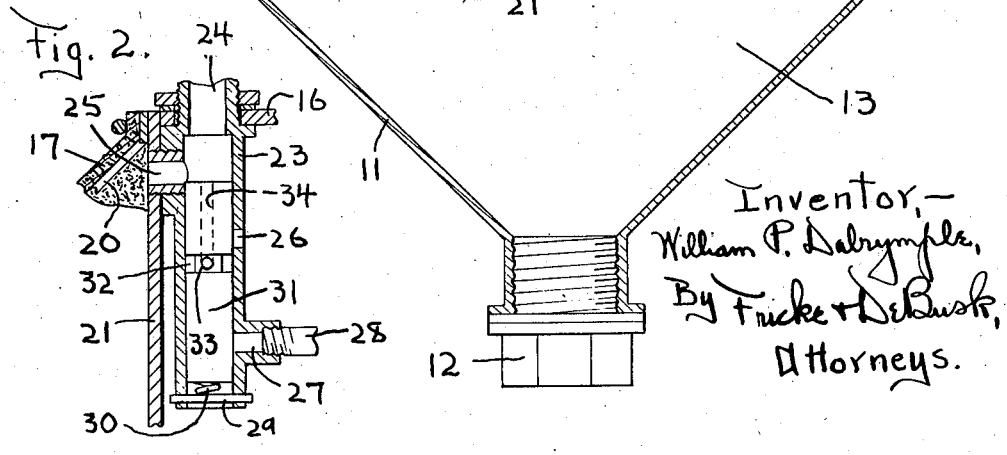
Fig. 2 is a view showing a fragmentary portion of the construction as shown in Fig. 1 but with the parts in changed position.

Referring now to Figs. 1 and 2, in which corresponding parts are indicated by the same reference characters, 10 and 11 indicate two connected parts making up a receptacle closed at its lower end by a removable plug 12. The interior of the receptacle is divided into an inlet chamber 13 at its lower end and an outlet chamber 14 at its upper end, the partition effecting such division comprising a ring 15, a plate 16 and a filtering medium 17 in the form of a felt sleeve connected with the ring 15 at its lower end and with the plate 16 at its upper end. A grille comprising rings 18 and 19 connected by a series of bars 20 is located within the sleeve 17 making up the filtering medium for holding such sleeve expanded into substantially cylindrical form.

A baffle plate 21 in the form of a cylinder is secured at its upper end to the plate 16 so as to be closed by said plate and so as to form with said plate an inverted dished member, such cylinder extending downwardly inside of the filtering medium 17 and the grille 20 in spaced relation thereto, being provided with an outwardly extending flange 22 at its lower end. Means is provided for delivering liquid under pressure into the inlet chamber 13 comprising a valve whose body 23 is secured within the cylinder 21 at its upper end, a nipple 24 on said body portion extending upwardly through the plate 16 and through the top wall of the receptacle member 10 to both of which it is connected by means of nuts secured by means of screw threads on the outer face of the nipple. The body portion 23 of the valve is in the form of a housing having an opening 25 through the side wall near its upper end, such opening being extended also through the wall of the cylinder 21. The housing is provided also with an opening 26 into the inlet chamber 13 within the cylinder 21 and a second opening 27 near its lower end adapted for the connection of a pipe 28 thereto as hereinafter described. The lower end of the housing 23 is open, being provided with a pin 29 therethrough forming a support for a coiled spring 30 which serves normally to hold a slide valve 31 in raised position as shown in said Fig. 1. At an intermediate point, the slide valve 31 is provided with a circumferential groove 32 with which an opening 33 through the wall of the valve communicates, the inner end of the opening 33 being in communication with a central bore 34 at the upper end portion of the valve.

As is clearly shown in Fig. 1, the pipe 28 is upwardly directed at one end so as to extend through suitable openings in the plate 16 and the top wall of the casing member 10 to both of which parts the pipe is connected by means of suitable nuts secured in position thereon by means of screw threads. A pipe 35 extends downwardly through a suitable opening in the top wall of the casing member 10 so as to open in fairly close proximity to the plate 16, said pipe being secured in position by means of suitable nuts secured thereon by means of screw threads. At its lower end, the cylinder 21 is provided with a partition comprising a piece of felt 36 extending thereacross, being held in position by means of a sleeve 37 and being supported with respect to upward pressure thereon by means of a reticulated plate 38.

In the use of my improved filter as shown, in connection with an automobile for cleaning the crank case oil, the nipple 24 of the valve is connected with the discharge side of the oil pump of the automobile. The pipe 35 is connected with the bearings of the car, constituting the principal outlet means for the filter, and the pipe 28 constituting an auxiliary outlet means is connected with the crank case of the engine, all as will be readily understood.

When oil is delivered under pressure downwardly through the nipple 24 from the oil pump, the pressure of the oil upon the valve 31 forces the valve downwardly against the action of the spring 30. When the groove 32 in the valve 31 comes into registry with the opening 26 through the housing 23 of the valve, a small quantity of oil is delivered through the bore 34, the opening 33 and the opening 26 directly into the inlet chamber 13 of the filter. As the valve 31 continues in its downward movement by reason of the pressure of the oil on its top face, the groove 32 is carried out of registry with the opening 26 so as very quickly to shut off the delivery of oil through said opening. When the parts reach the position as shown in Fig. 2, the oil coming downwardly through the nipple 24 passes directly through the opening 25 into the inlet chamber 13 adjacent to the inner or inlet chamber face of the filtering medium 17 through which the oil is forced under pressure for escape through the pipe 35 leading to the bearings of the car. Inasmuch as it requires a considerable pressure to force the oil through the pipe 35 and through the communicating bearings at the desired speed for proper lubrication, it will be appreciated that a pressure condition is very quickly built up within the receptacle comprising the inlet and outlet chambers 13 and 14, serving to compress the air within the upper end portion of each of said chambers. I have indicated in dotted lines approximately the level of the top surface of the oil within each of the chambers 13 and 14, such dotted line in the outlet chamber being indicated by the numeral 39 while the dotted line indicating the level of the liquid in the inlet chamber is indicated by the numeral 40. As will be readily understood, the pressure condition continues and remains substantially constant during the normal delivery of oil through the inlet means comprising the valve arrangement as shown. When, however, the delivery of oil through the inlet means ceases, the valve 31 returns to its normal position as shown in Fig. 1 under the influence of the spring 30. With the valve in the position as shown in Fig. 1, the oil is free to move directly upwardly through the open lower end of the body 23 of the valve and through the opening 27 and the pipe 28 to the crank case of the automobile, such movement of oil being caused by the expansion of the air trapped in the upper ends of the inlet and outlet chambers 13 and 14. As will be readily understood, when the compressed air in the upper end of the outlet chamber 14 expands so as to relieve the pressure within the receptacle, a substantial amount of oil is caused to flow in the reverse direction through the filtering medium 17 from the outlet chamber into the inlet chamber so as to escape through the pipe 28 to the crank case of the engine. Such oil is caused to pass downwardly about the lower edge of the cylinder 21 and then to pass upwardly through the filtering medium 36 for access to the lower end of the valve for escape through the pipe 28.

During the normal operation of the car by which normal use of the filter is brought about, the oil passes in considerable quantities through the filtering medium 17 from the inside out, depositing the dirt and grit upon the inner or inlet chamber face of the filtering medium 17. When a considerable flow of oil in the reverse direction is effected through the filtering medium, the dirt and grit are loosened from the inner face of the filtering medium and are washed down therefrom so as to settle in the lower end of the inlet chamber 13. Inasmuch as this cleaning operation takes place at a time when the delivery of oil to the filter has ceased, the dirt and grit are permitted to settle into or toward the bottom of the inlet chamber 13 entirely out of the path of movement of the oil to the pipe 35 or to the pipe 28. The oil which passes through the filtering medium 17 in the reverse direction and thence downwardly about the edge of the cylinder 21 for escape through the pipe 28 is prevented from carrying any of the dirt and grit from the sludge portion of the inlet chamber by reason of its passage through the filtering medium 36. The dirt and grit which gather on the bottom face of the filtering medium 36 by reason of the passage of oil upwardly through it are loosened and discharged more or less completely by a slight reversed flow through such filtering medium brought about by the delivery of oil into the upper portion of the inlet chamber through the opening 26 as above described when the valve moves downwardly.

The inlet chamber 13 is to be of any desired size or depth consistent with the provision of a fairly deep settling chamber portion. I have found in practice that the parts may be made of suitable size without unduly lengthening the filter as a whole so as to be available conveniently in connection with the ordinary automobile engine. By reason of the systematic cleaning of the filtering medium at fairly short intervals, the filter may be made to carry the full flow of oil from the pump, the cleaned filtering medium of fairly small area being capable of cleaning the full flow of oil efficiently without the development of undue pressure within the filter.

When it is desired to clean the sludge chamber portion of the inlet chamber 13, this is effected by a removal of the plug 12 so as to permit a quantity of oil within the chamber to wash the collected dirt and grit downwardly. I have found in practice that with a receptacle of moderate size it is not necessary that the sludge chamber be cleaned out oftener than once or twice a year for a travel of ten or fifteen thousand miles under ordinary conditions.

Figure 3:
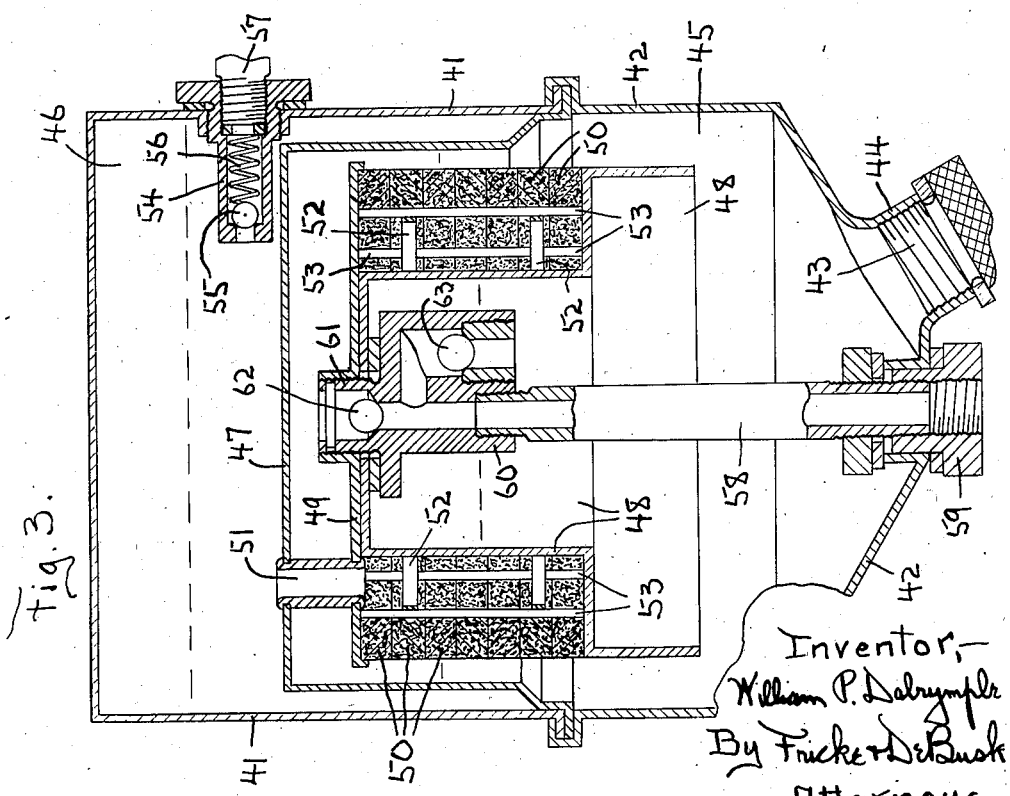
Fig. 3 is a central vertical section through a modified form of filter.

In the arrangement shown in Fig. 3, a receptacle comprising a top section 41 and a bottom section 42 is used, a screw-threaded plug 43 being employed for closing a drain opening 44 at the lower end of the receptacle. The interior of the receptacle is divided into inlet and outlet portions 45 and 46 by means comprising an inverted dished member 47, a second inverted dished member 48 inside of said member 47, a plate 49 above the member 48, a series of felt rings 50 forming a vertical cylindrical wall between the member 48 and the plate 49, and a sleeve 51 connecting the space above the dished member 47 with the space between the member 48 and the felt rings 50, such latter space forming thus through the sleeve 51 an extension of the outlet chamber 46. The felt rings 50 are supported in extended position by means of a grille formed of rings 52 and upright bars 53.

Outlet means is provided leading from the outlet chamber 46 comprising a sleeve 54 having screw-threaded connection with the wall of the section 41 of the receptacle, such sleeve 54 being provided with an outwardly opening valve 55 in the form of a ball yieldingly held in position by a coiled spring 56. An outlet pipe 57 is connected with the outer end portion of the sleeve 54.

Inlet means is provided in communication with the inlet chamber 45 for introducing liquid under pressure into the inlet chamber, comprising a pipe 58 connected at its lower end with a fitting 59 by which the pipe is held in fixed position in an opening through the wall of the lower member 42 of the receptacle casing, the upper end of the pipe 58 being connected by means of screw threads with a valve casing 60 which in turn is provided with a nipple 61 which extends through a suitable opening in the top wall of the dished member 48 and is secured by means of screw threads in an opening in the plate 49. The valve casing 60 provides an opening upwardly into the inlet chamber 45 above the plate 49, and an opening downwardly into the inlet chamber inside of the dished member 48. An upwardly opening ball valve 62 prevents movement of liquid downwardly into the pipe 58 from the space above the plate 49, and a ball valve 63 prevents movement of liquid outwardly from the pipe 58 into the space within the dished member 48.

When oil, water, or other liquid to be filtered is forced upwardly through the pipe 58, such liquid is forced upwardly into the inlet chamber 45 above the plate 49. From this position, the liquid passes to the outer face of the filtering medium comprising the felt rings 50 and is forced through such filtering medium into the extension of the outlet chamber about the member 48 and thence upwardly through the sleeve 51 for escape through the outlet sleeve 54 and pipe 57. The spring 56 is of sufficient strength to prevent the escape of liquid through the casing 54 until a pressure condition has been established within the inlet and outlet chambers 45 and 46. As will be readily understood, if the pipe 57 is connected with the bearings of an automobile in connection with the use of the filter for cleaning the crank case oil, the spring 56 will not ordinarily be of any considerable strength since the resistance to the flow of the oil through the bearings is sufficient for insuring the establiment of a fairly heavy pressure within the filter. If, however, the pipe 57 opens into a receptacle involving very little if any resistance to the passage of the liquid, then it is necessary that the spring 56 be correspondingly heavier in order to insure the establishment of the required degree of compression within the filter. In either event, the air in the upper ends of the inlet chamber 45 and the outlet chamber 46 is substantially compressed during the delivery of liquid through the inlet pipe 58.

When the delivery of liquid upwardly through the pipe 58 ceases, the compressed air in the upper end of the inlet chamber 45 serves to force a substantial amount of oil upwardly past the ball valve 63 for escape downwardly through the pipe 58, the liquid being adapted to escape backwardly through such pipe,—as, for example, past the veins of an oil pump of a usual type employed in connection with some makes of automobile. At the same time, a limited amount of oil may possibly be passing outwardly from the outlet chamber 46 through the outlet sleeve 54 and the outlet pipe 57 through the bearings. I have found in practice, however, in connection with a filter of this type used on an automobile having the type of oil pump specified, that the pressure condition in the upper end of the outlet chamber 46 serves effectively for forcing a substantial amount of oil from the outlet chamber 46 backwardly through the filtering medium comprising the rings 50 in the reverse direction into the inlet chamber 45 from which the oil escapes past the ball valve 63 and downwardly along the inlet pipe 58, the resistance being smaller through the pump than through the bearings. Such backward movement of the oil through the filtering rings 50 causes the dirt and grit to be freed from the filtering medium so as to settle into the lower end portion of the inlet chamber 45. Inasmuch as the movement of the oil backwardly through the filtering medium 50 takes place over a comparatively large expanse of surface, it will be appreciated that the contents of the inlet chamber 45 are stirred up very little if at all by the receipt of additional oil into the inlet chamber so that there is very small probability that the oil passing downwardly and inwardly about the lower edge of the dished member 48 will carry any of the dirt or grit upwardly to the valve 63 and out through the inlet pipe 58. By reason of the slow movement of the oil and the relative position of the parts, the oil passing upwardly for escape through the valve will be clean oil while the dirt and grit will settle to or toward the bottom of the inlet chamber.

In the arrangement shown in Fig. 4, I have provided a top casing member 86 and a bottom casing member 87 having an outlet opening at its lower end closed by a screw-threaded plug 88. Across the lower end portion of the receptacle I have provided a conduit 89 held in position by means of sleeve members 90 and 91 at its opposite ends, such sleeve member 90 forming the means for connecting an inlet pipe 92 from the pump of an automobile to one end of the conduit and the sleeve 91 serving as the means for connecting an auxiliary outlet pipe 93 to the other end of the conduit, the pipe 93 serving as a connection between the conduit and the crank case of the automobile. Near its upper end, I have provided a plate 94 serving to divide the receptacle into inlet and outlet portions, the portion above the plate 94 comprising an outlet chamber 95 and the portion below the plate except as hereinafter described comprising an inlet chamber 96, the conduit 89 being located within said inlet chamber. In the arrangement shown, an outlet chamber extension 97 is provided comprising an inverted dished member 98, a transversely disposed plate 99, a filtering medium 100 in the form of a sleeve connecting the plate 99 with the lower end of the dished member 98, and a sleeve 101 connecting the plates 94 and 99 so as to cause the extension outlet chamber portion to communicate with the outlet chamber 95 proper. In the arrangement shown the filter member 100 is held in extended condition by a coiled spring 102 fitting snugly therein.

Within the dished member 98, I have provided a second dished member 103 of smaller size so as to stand in spaced relation to the member 98, the lower edge portion of the member 103 being connected by a fine screen member 104 with the upper end portion of the member 98, such screen member being reenforced and strengthened by a coiled spring 105 fitted therein. By the provision of the dished member 103 and the screen 104, I have provided an auxiliary outlet chamber 106. In the arrangement shown the auxiliary outlet chamber 106 is connected with the extension outlet chamber portion 97 by means of a sleeve 108 in which a ball valve 109 is provided which is adapted to open upwardly against the force of a spring 110 seated in said sleeve.

The conduit 89 is provided with two openings 111 and 112 in its upper wall, the opening 112 being in communication with a pipe 113 which opens near the upper end of the inlet chamber portion located within the dished member 103. The opening 111 is provided with a pipe 114 extending upwardly through the members 103 and 98 and through the plate 99, the extension through the plate 99 being effected through the medium of a fitting 115 which is provided with an upwardly opening ball valve 116.

Within the conduit 89, I have provided a slide valve 117 which in the arrangement shown is in the form of a shell. A spring 118 bears at one end against the valve 117 and at its opposite end against the sleeve 91, serving to hold the valve 117 normally in the position as shown in Fig. 4 so as to close the lower end of the opening 111, the valve in such position standing clear of the opening 112. Within the shell of the valve 117, I have provided a ball valve 119 which is held by a spring 120 in position to close an opening 121 in the end of the shell, the ball valve 119 and the valve 117 both closing toward the left in said Fig. 4. A ring 122 in fixed position within the conduit serves to limit the motion of the valve 117 toward the right in said figure.

The primary outlet opening from my improved filter is provided through the medium of a sleeve 123 adapted to be connected by a pipe 124 with the bearings for lubrication by the crank case oil. A ball valve 125 opening toward the right in Fig. 4 is normally held in position by a spring 126 for closing the outlet opening.

When oil is delivered through the pipe 92 from the pump of an automobile, the valve 117 is moved as a whole toward the right into the position as shown in Fig. 5 serving to open the lower end of the opening 111 and to close the lower end of the opening 112 as shown in Fig. 5. The oil delivered through the pipe 92 is thus forced upwardly through the pipe 114 and past the ball valve 116 into the inlet chamber 96 above the plate 99. Such oil is then forced inwardly through the filtering medium 100 into the outlet chamber extension 97 and thence through the sleeve 101 and out through the principal outlet means 123 past the ball valve 125 to the bearings. The filtering medium 100 is preferably in the form of a felt sleeve which serves effectively for filtering the oil when the oil becomes heated by the action of the motor. When the oil is cold, however, the filtering medium 100 of felt provides very strong resistance against the passage of the oil therethrough. Under such circumstances, the oil is free to pass through the screen 104 into the auxiliary outlet chamber 106 and thence upwardly through the sleeve 108 past the ball valve 109 for escape through the sleeve 101 and the outlet means comprising the pipe 124. It will be understood, of course, that the oil can pass through the screen 104 only upon condition that it overcomes the resistance offered by the spring seated valve 109, but I have found in practice that the oil when cold passes more freely through a very fine screen so as to open a pressure valve than it does through a filtering medium of felt of such texture as to provide an effective filtering medium for hot oil. The spring 110 is, of course, to be of such size as to provide the desired differential action with respect to the two filtering mediums 100 and 104. The arrangement is preferably such that the greater portion of the oil will pass through the screen 104 while the oil is cold and that then the greater portion of the oil will pass through the filtering medium 100 after the oil becomes heated.

By reason of the resistance to the passage of the oil through the outlet pipe 124 to the bearings, plus the resistance offered by the spring pressure valve 125, the resistance to the entrance of the oil through the pipe 92 is comparatively great and a fairly intensive pressure condition is established within the filter. When the pressure of the oil entering through the pipe 92 against the valve 117 ceases, by reason of the stoppage of the engine pump or otherwise, the valve 117 is moved from the position as shown in Fig. 5 to the position of said valve as shown in Fig. 4, serving to close the lower end of the opening 111 and the pipe 114 and to open the lower end of the opening 112. Under such conditions, the compressed air in the upper end of the inlet chamber 96 forces a limited amount of oil from the inlet chamber downwardly through the pipe 113. At the same time, the compressed air within the outlet chamber 95 forces a substantial amount of oil outwardly in the reverse direction through the filtering medium 100 serving to effect a cleaning operation with respect to the filtering medium, the additional oil forced into the inlet chamber being adapted to escape downwardly through the pipe 113 for movement to the crank case through the pipe 93. At the same time, the compressed air in the upper end of the auxiliary outlet chamber surrounding the dished member 103 serves to cause a substantial flow of oil outwardly in the reverse direction through the screen 104 serving to effect a cleaning operation with respect to the screen. As will be readily understood, this cleaning effect with respect to the screen 104 takes place upon each stoppage of the delivery of oil through the inlet pipe 92 whether or not the screen 104 has been functioning as an auxiliary filtering medium. This is, of course, by reason of the fact that a pressure condition is established within the auxiliary outlet chamber 106 whether or not oil is forced upwardly past the ball valve 109. The arrangement is such that the dirt and grit cleared from the inlet chamber faces of the filtering mediums 100 and 104 settle directly into the lower end portion of the inlet chamber 96 out of the path of the movement of the slow moving oil passing inwardly about the lower edges of the dished members 98 and 103 for escape into the mouth of the pipe 113 for delivery through the auxiliary outlet means to the crank case.

In case the pressure within the pipe 92 becomes excessive, the ball valve 119 is adapted to open against the action of the spring 120 for permitting oil to pass directly through the filter in by-pass relation to the filtering medium. The spring 120 is to be of such strength, however, as to prevent such by-passing effect unless the pressure becomes excessive, and such that after the valve 119 has opened to some such position as shown in Fig. 6 the pressure through the filtering mediums is still maintained at or above the minimum normal pressure desired. The filtering is accordingly effected continuously even after the opening of the valve 119.

By my improved arrangement, I have provided an improved construction in which a pressure condition is automatically built up within the filter so as to be effective at the end of a period of use of the filter to cause a flow of liquid in the reverse direction through the filtering medium in such manner as to clean the filtering medium, the arrangement being such that the pressure within the filter is adapted to be relieved at the end of a period of use of the filter so as to provide for the desired reverse flow of the liquid through the filtering medium.

By my improved arrangement, I have provided a construction in which a comparatively very large volume of oil may be passed through a filter and effectively cleaned thereby through long continued periods of normal use without the necessity for having the size of the filter area extended beyond a normal proportion to the size of the filter casing and without the necessity for unduly increasing the size of the strainer openings in the felt or other filtering medium through which the oil passes.

While I prefer to employ the form of mechanism as shown in my drawings and as above described, it is to be understood that my invention is not limited to such forms except so far as the claims may be so limited by the prior art, it being understood that changes might well be made in the construction without departing from the spirit of my invention.

I claim:—

1. In a filter, the combination of a receptacle, a dished member open at its lower end extending partially across the receptacle at a substantial distance above the lower end of the receptacle, means comprising a filtering medium surrounding said dished member in outwardly spaced relation thereto and adapted in cooperation with said dished member to divide the receptacle into inlet and outlet portions with the filtering medium arranged in such position that the grit and dirt from the inlet chamber face thereof are adapted to settle into the lower part of the inlet chamber when released by a cleaning operation, outlet means communicating with the outlet chamber adapted to permit liquid to escape therethrough under pressure, auxiliary outlet means opening from said inlet chamber with its mouth located within said dished member at a point well above the lower edge of said dished member, and means for delivering liquid to be filtered into said inlet chamber outside of said dished member at about the level of the uppermost portion of said dished member under such pressure as to pass through said filtering medium and to escape through said first named outlet means and adapted to establish a pressure condition within said receptacle, the arrangement being such that when the delivery of liquid to said inlet chamber has ceased the pressure is relieved by the escape of liquid through said auxiliary outlet means and that the readjustment incident to such escape of liquid causes a substantial flow of liquid through said filtering medium in the reverse direction for cleaning the filtering medium.

2. In a filter, the combination of a receptacle, means comprising a filtering medium for dividing the receptacle into inlet and outlet chambers arranged in such relation that the grit and dirt from the filtering medium when released by an operation of cleaning the filtering medium are adapted to settle into the lower portion of the inlet chamber, outlet means communicating with the outlet chamber adapted to permit liquid to escape therethrough under pressure, means for delivering liquid to be filtered into said inlet chamber under such pressure as to escape through said outlet means and arranged to cooperate with other parts at intervals when the flow of liquid into the receptacle ceases to cause a substantial flow of liquid through said filtering medium in the reverse direction for cleaning the filtering medium, and means comprising a second filtering medium adapted to provide an auxiliary outlet chamber communicating with said first named outlet chamber through which second filtering medium the liquid may pass in lieu of passing through said first named filtering medium and arranged in such position with respect to the inlet chamber that the grit and dirt when cleaned from said second filtering medium are adapted to settle into the bottom portion of said inlet chamber.

3. In a filter, the combination of a receptacle, means comprising a filtering medium for dividing the receptacle into inlet and outlet chambers arranged in such relation that the grit and dirt from the filtering medium when released by an operation of cleaning the filtering medium are adapted to settle into the lower portion of the inlet chamber, outlet means communicating with the outlet chamber adapted to permit liquid to escape therethrough under pressure, means for delivering liquid to be filtered into said inlet chamber under such pressure as to escape through said outlet means and arranged to cooperate with other parts at intervals when the flow of liquid into the receptacle ceases to cause a substantial flow of liquid through said filtering medium in the reverse direction for cleaning the filtering medium, and means comprising a second filtering medium adapted to provide an auxiliary outlet chamber communicating with said first named outlet chamber through which second filtering medium the liquid may pass in lieu of passing through said first named filtering medium and arranged in such position with respect to the inlet chamber that the grit and dirt when cleaned from said second filtering medium are adapted to settle into the bottom portion of said inlet chamber, said second filtering medium and its associated parts being adapted normally to resist the flow of liquid therethrough much more strongly than does said first named filtering medium and its associated parts.

4. In a filter, the combination of a receptacle, means comprising a filtering medium for dividing the receptacle into inlet and outlet chambers arranged in such relation that the grit and dirt from the filtering medium when released by an operation of cleaning the filtering medium are adapted to settle into the lower portion of the inlet chamber, outlet means communicating with the outlet chamber adapted to permit liquid to escape therethrough under pressure, means for delivering liquid to be filtered into said inlet chamber under such pressure as to escape through said outlet means and arranged to cooperate with other parts at intervals when the flow of liquid into the receptacle ceases to cause a substantial flow of liquid through said filtering medium in the reverse direction for cleaning the filtering medium, means comprising a second filtering medium adapted to provide an auxiliary outlet chamber communicating with said first named outlet chamber through which second filtering medium the liquid may pass in lieu of passing through said first named filtering medium and arranged in such position with respect to the inlet chamber that the grit and dirt when cleaned from said second filtering medium are adapted to settle into the bottom portion of said inlet chamber, and a pressure valve through which the liquid must pass from said auxiliary outlet chamber to said first named outlet chamber arranged normally to prevent flow of liquid through said second filtering medium until the pressure of the liquid in the inlet chamber has reached a certain predetermined maximum.

5. In a filter, the combination of a receptacle having a conduit leading directly across the receptacle near the bottom with two openings in the side of the conduit, means comprising a filtering medium for dividing the receptacle into inlet and outlet chambers with the conduit located in the inlet chamber and so arranged that the grit and dirt released by an operation of cleaning the filtering medium are adapted to settle into the bottom portion of the inlet chamber, outlet means communicating with the outlet chamber adapted to permit liquid to escape therethrough under pressure, means for delivering liquid to be filtered into one end of said conduit for delivery through one of said openings in the side of the conduit into said inlet chamber under such pressure as to escape through said outlet means, a valve slidably mounted in said conduit so as to cover either of the openings in the side of the conduit alternatively, a pipe communicating at its lower end with said conduit at one of said openings and open at its upper end near the top of the inlet chamber, an upwardly opening valve in said pipe, a second pipe connected at its lower end with said conduit at the other of said openings and open into said inlet chamber at a substantial distance above the conduit, yielding means adapted normally to hold said first named valve in position for effectively closing the opening from said conduit into said first named pipe while leaving the second pipe open and adapted to yield for movement of the valve into position to admit liquid under pressure into said first named pipe, said first named valve having a longitudinal opening therethrough, and a pressure valve yieldingly seated in the longitudinal opening through said first named valve adapted when the pressure of the liquid in said conduit reaches a certain predetermined maximum to yield for permitting the passage of liquid directly through said conduit in by-pass relationship to said filtering medium.

6. In a filter, the combination of a casing, a dished member located in inverted position transversely of the casing, a filter member in the form of a sleeve secured at its lower end to said dished member and extending upwardly in outwardly spaced relation to the side wall portion of said dished member, means connecting the upper end of said filter member with the wall of the casing serving with the dished member and the filter member to divide the casing into inlet and outlet chambers, means for delivering liquid to be filtered to the inlet chamber at the outer face of said filter sleeve, outlet means communicating with said outlet chamber at the opposite face of said filter sleeve for taking the filtered liquid from the casing, auxiliary outlet means opening to the inlet chamber within said dished member at a substantial distance above the lower end of said dished member so as to be separated effectively by the wall of the dished member from the inlet chamber face of the filter member, and valve means adapted to close said auxiliary outlet means during the period when liquid for filtering is being delivered under pressure to said casing.

7. In a filter, the combination of a casing, a dished member located in inverted position transversely of the casing, a filter member in the form of a sleeve secured at its lower end to said dished member and extending upwardly in outwardly spaced relation to the side wall portion of said dished member, means connecting the upper end of said filter member with the wall of the casing serving with the dished member and the filter member to divide the casing into inlet and outlet chambers, means for delivering liquid to be filtered to the inlet chamber at the outer face of said filter sleeve, outlet means communicating with said outlet chamber at the opposite face of said filter sleeve for taking the filtered liquid from the casing, auxiliary outlet means opening to the inlet chamber within said dished member at a substantial distance above the lower end of said dished member whereby the liquid flowing toward the mouth of said auxiliary outlet means moves in the opposite direction from that in which the liquid moves in its passage through the filter means from the outlet chamber to the inlet chamber, and valve means controlled by the pressure of the liquid being delivered to the casing for closing said auxiliary outlet means during the period when said liquid is entering the casing.

8. In a filter, the combination of a casing, a dished member located in inverted position transversely of the casing, a filter member in the form of a sleeve secured at its lower end to said dished member and extending upwardly in outwardly spaced relation to the side wall portion of said dished member, means connecting the upper end of said filter member with the wall of the casing serving with the dished member and the filter member to divide the casing into inlet and outlet chambers, a second dished member in inverted position inside of said first named dished member, a second filter member in the form of a sleeve secured at its upper end to said first named dished member and extending downwardly in outwardly spaced relation to said second dished member and connected at its lower end with the lower end of said second dished member, a pressure relief valve opening from the space between said two dished members and discharging in communication with said outlet chamber in by-pass relation to said first named filter member, means for delivering liquid to be filtered to the inlet chamber at the outer faces of said filter sleeves, and outlet means communicating with said casing at the outlet chamber faces of said filter sleeves for taking the filtered liquid from the casing.

9. In a filter, the combination of a receptacle, means comprising a filter medium for dividing the receptacle into inlet and outlet chambers arranged in such relation that the grit and dirt from the inlet chamber face of the filtering medium are adapted to settle into the lower portion of the inlet chamber when released by a cleaning operation from the filtering medium, outlet means communicating with the outlet chamber adapted to permit liquid to escape therethrough under pressure, other outlet means opening from the inlet chamber at a point in such spaced relation to the path along which the grit and dirt settle when released from the face of the filtering medium as to prevent the grit and dirt in such movement from entering said second named outlet means and open at all times when liquid is not being delivered under pressure to said inlet chamber for permitting the escape of liquid from the inlet chamber, and means for delivering liquid to be filtered into said inlet chamber under such pressure as to escape through said first named outlet means and so as to establish a pressure condition within said receptacle which serves automatically when the delivery of liquid to the receptacle ceases to cause a substantial flow of liquid through said filtering medium in the reverse direction and out through said second named outlet means until the pressure in the receptacle is substantially relieved for cleaning the filtering medium.

10. In a filter, the combination of a receptacle, means comprising a filter medium for dividing the receptacle into inlet and outlet chambers arranged in such relation that the grit and dirt from the inlet chamber face of the filtering medium are adapted to settle into the lower portion of the inlet chamber when released by a cleaning operation from the filtering medium, outlet means communicating with the outlet chamber adapted to permit liquid to escape therethrough under pressure, means for delivering liquid to be filtered into said inlet chamber under such pressure as to escape through said outlet means and to establish a pressure condition within the receptacle, other outlet means opening from the inlet chamber adapted when delivery of liquid under pressure to the inlet chamber has ceased to permit free escape of liquid therethrough from the inlet chamber until the pressure condition in said inlet chamber has been relieved, and an inverted dished member closed at the top and at the sides about the mouth of said second named outlet means and of such size as to maintain a comparatively large quantity of liquid about said mouth in position to escape through said second named outlet means and serving by the presence of the normally clean liquid at least to delay substantially any movement of the liquid with the settling grit and dirt therein to said second named outlet.

11. In a filter, the combination of a receptacle, a dished member open at its lower end extending partially across the receptacle at a substantial distance above the lower end of the receptacle, means comprising a filtering medium surrounding said dished member in outwardly spaced relation thereto and adapted in cooperation with said dished member to divide the receptacle into inlet and outlet portions with the filtering medium arranged in such position that the grit and dirt from the inlet chamber face thereof are adapted to settle into the lower part of the inlet chamber when released by a cleaning operation, outlet means communicating with the outlet chamber adapted to permit liquid to escape therethrough under pressure, auxiliary outlet means opening from said inlet chamber with its mouth located within said dished member at a point well above the lower edge of said dished member, means for delivering liquid to be filtered into said inlet chamber outside of said dished member at about the level of the uppermost portion of said dished member under such pressure as to pass through said filtering medium and to escape through said first named outlet means and adapted to establish a pressure condition within said receptacle, the arrangement being such that when the delivery of liquid to said inlet chamber has ceased the pressure is relieved by the escape of liquid through said auxiliary outlet means and that the readjustment incident to such escape of liquid causes a substantial flow of liquid through said filtering medium in the reverse direction for cleaning the filtering medium, and a second filtering medium having an effective location between the inlet chamber face of said first named filtering medium and said second outlet means for preventing the liquid escaping through said second outlet means from carrying out with it the dirt and grit released from the first named filtering medium.

12. In a filter, the combination of a receptacle, a dished member open at its lower end extending partially across the receptacle at a substantial distance above the lower end of the receptacle, means comprising a filtering medium surrounding said dished member in outwardly spaced relation thereto and adapted in cooperation with said dished member to divide the receptacle into inlet and outlet portions with the filtering medium arranged in such position that the grit and dirt from the inlet chamber face thereof are adapted to settle into the lower part of the inlet chamber when released by a cleaning operation, outlet means communicating with the outlet chamber adapted to permit liquid to escape therethrough under pressure, auxiliary outlet means opening from said inlet chamber with its mouth located within said dished member at a point well above the lower edge of said dished member, means for delivering liquid to be filtered into said inlet chamber outside of said dished member at about the level of the uppermost portion of said dished member under such pressure as to pass through said filtering medium and to escape through said first named outlet means and adapted to establish a pressure condition within said receptacle, the arrangement being such that when the delivery of liquid to said inlet chamber has ceased the pressure is relieved by the escape of liquid through said auxiliary outlet means and that the readjustment incident to such escape of liquid causes a substantial flow of liquid through said filtering medium in the reverse direction for cleaning the filtering medium, and a second filtering medium extending across said dished member below said second named outlet means serving to prevent liquid escaping through said second outlet means from carrying out with it the dirt and grit released from the first named filtering medium.

13. In a filter, the combination of a receptacle, means comprising a filtering medium for dividing the receptacle into inlet and outlet chambers, outlet means communicating with said outlet chamber, means for forcing liquid under pressure into said inlet chamber and thence through the filtering medium and out through said outlet means, and other means comprising valve mechanism adapted to stand yieldingly in normal position for permitting free movement of liquid under pressure out of the inlet chamber therethrough at all times except when liquid is being forced into said inlet chamber through said inlet means and adapted to be moved into changed position by the pressure of liquid entering the inlet chamber through said inlet means so as to prevent movement of liquid out of the inlet chamber therethrough when liquid is being forced into said inlet chamber through said inlet means.

14. In a filter, the combination of a receptacle, means comprising a filter medium for dividing the receptacle into inlet and outlet chambers arranged in such relation that the grit and dirt from the inlet chamber face of the filtering medium are adapted to settle into the lower portion of the inlet chamber when released by a cleaning operation from the filtering medium, outlet means communicating with the outlet chamber adapted to permit liquid to escape therethrough under pressure, other outlet means opening from the inlet chamber at a point in such spaced relation to the path along which the grit and dirt settle when released from the face of the filtering medium as to prevent the grit and dirt in such movement from entering said auxiliary outlet means and open at all times when liquid is not being delivered under pressure to said inlet chamber for permitting escape of liquid from the inlet chamber, means for delivering liquid to be filtered into said inlet chamber under such pressure as to escape through said first named outlet means and so as to establish a pressure condition within said receptacle which serves automatically when the delivery of liquid to the receptacle ceases to cause a substantial flow of liquid through said filtering medium in the reverse direction and out through said second named outlet means until the pressure in the receptacle is substantially relieved for cleaning the filtering medium, and a second filter member having an effective location between the inlet chamber face of said first named filtering medium and said second outlet means for preventing the liquid escaping through said second outlet means from carrying out with it the dirt and grit released from the first named filtering medium.

15. In a filter, the combination of a receptacle, means comprising a filtering medium for dividing the receptacle into inlet and outlet chambers, outlet means communicating with said outlet chamber, means for forcing liquid under pressure into said inlet chamber and thence through the filtering medium and out through said outlet means, other means comprising valve mechanism adapted to stand yieldingly in normal position for permitting free movement of liquid under pressure out of the inlet chamber therethrough at all times except when liquid is being forced into said inlet chamber through said inlet means and adapted to be moved into changed position by the pressure of liquid entering the inlet chamber through said inlet means so as to prevent movement of liquid out of the inlet chamber therethrough when liquid is being forced into said inlet chamber through said inlet means, and a second filter member having an effective location between the inlet chamber face of said first named filtering medium and said second mentioned outlet means for preventing the liquid escaping through said second outlet means from carrying out with it the dirt and grit released from the first named filtering medium.

WILLIAM P. DALRYMPLE.